(12) United States Patent
Ootani

(10) Patent No.: US 9,796,098 B2
(45) Date of Patent: Oct. 24, 2017

(54) MECHANICAL STOPPER DEVICE HAVING ELASTICALLY DEFORMABLE BODY WITH SLIT, AND MULTI-JOINT ROBOT HAVING THE STOPPER DEVICE

(71) Applicant: FANUC CORPORATION, Minamitsuru-gun, Yamanashi (JP)

(72) Inventor: Kentarou Ootani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 255 days.

(21) Appl. No.: 14/016,509

(22) Filed: Sep. 3, 2013

(65) Prior Publication Data

US 2014/0060235 A1 Mar. 6, 2014

Related U.S. Application Data

(60) Provisional application No. 61/697,942, filed on Sep. 7, 2012.

(30) Foreign Application Priority Data

Sep. 4, 2012 (JP) ................................. 2012-194173

(51) Int. Cl.
*B25J 17/00* (2006.01)
*B25J 19/00* (2006.01)
*B25J 9/10* (2006.01)

(52) U.S. Cl.
CPC ............... *B25J 19/00* (2013.01); *B25J 9/101* (2013.01); *Y10T 74/20329* (2015.01)

(58) Field of Classification Search
CPC .... B25J 19/0091; B25J 19/0004; B25J 17/00; B25J 19/0041; E05F 5/02; E05F 5/06;
(Continued)

(56) References Cited

U.S. PATENT DOCUMENTS

| 4,828,094 A | 5/1989 | Torii et al. |
| 4,934,504 A | 6/1990 | Torii et al. |

(Continued)

FOREIGN PATENT DOCUMENTS

| CN | 201301889 Y | 9/2009 |
| CN | 201792264 U | 4/2011 |

(Continued)

OTHER PUBLICATIONS

Office Action dated Jun. 10, 2014, corresponds to Japanese patent application No. 2012-194173.

*Primary Examiner* — Zakaria Elahmadi
(74) *Attorney, Agent, or Firm* — Hauptman Ham, LLP

(57) ABSTRACT

A mechanical stopper device having a desirable stopper function while having a simple structure, and a multi-joint robot having the mechanical stopper device. A mechanical stopper is constituted by an elastically deformable body arranged on a second arm, and a contacting member arranged on a first arm so that the deformable body comes into contact with the contacting member when the second arm is rotated by a predetermined angle. The spring pin has a slit extending in the longitudinal direction thereof, and the extending direction of the slit when the pin is inserted into a hole intersects with a contact direction of the spring pin against the contacting member.

6 Claims, 4 Drawing Sheets

(58) Field of Classification Search
CPC ...... E05F 5/00; E05F 5/022; E05F 5/025; E05F 5/04; E05F 5/08; F16F 1/028; F16F 7/10; F16F 7/104; F16F 2236/10
USPC .......... 74/490.01; 16/85; 267/137, 158, 140, 267/141, 160; 901/49; 192/138
See application file for complete search history.

(56) References Cited

U.S. PATENT DOCUMENTS

| | | | | |
|---|---|---|---|---|
| 5,193,658 | A | * | 3/1993 | Tellden .................. 192/138 |
| 5,667,204 | A | * | 9/1997 | Slocum ................... 267/136 |
| 2003/0020424 | A1 | | 1/2003 | Weiss et al. |
| 2007/0089963 | A1 | | 4/2007 | Kinoshita et al. |
| 2008/0023899 | A1 | * | 1/2008 | Hasegawa ........... F16F 7/108 267/141.1 |
| 2010/0178101 | A1 | | 7/2010 | Day et al. |
| 2011/0072918 | A1 | * | 3/2011 | Reekers ..................... 74/55 |

FOREIGN PATENT DOCUMENTS

| | | |
|---|---|---|
| CN | 102452475 A | 5/2012 |
| DE | 3751450 T2 | 5/1996 |
| DE | 29616401 U1 | 10/1997 |
| DE | 10125445 A1 | 12/2002 |
| DE | 102004046034 A1 | 4/2006 |
| DE | 102009043404 A1 | 9/2011 |
| JP | 349435 U | 5/1991 |
| JP | 05-228882 A | 9/1993 |
| JP | 1047337 A | 2/1998 |
| JP | 2002264069 A | 9/2002 |
| JP | 2007-050499 A | 3/2007 |
| JP | 2008249073 A | 10/2008 |
| JP | 2010-023194 A | 2/2010 |

* cited by examiner

PRIOR ART

MECHANICAL STOPPER DEVICE HAVING ELASTICALLY DEFORMABLE BODY WITH SLIT, AND MULTI-JOINT ROBOT HAVING THE STOPPER DEVICE

BACKGROUND OF THE INVENTION

1. Field of the Invention

The present invention relates to a mechanical stopper device for limiting a movable range of a robot arm, and a multi-joint robot having the mechanical stopper device.

2. Description of the Related Art

Each joint of a multi-joint robot has a structure wherein two arms are connected by a rotation axis. When an arm is about to rotate beyond a predetermined range due to malfunction, a mechanical stopper device (or a mechanical stopper) is provided for safety, as well as an electric limiting structure.

FIG. 9 shows an example of a multi-joint robot 100 having a conventional mechanical stopper. Robot 100 has a first arm 112 and a second arm 116 rotatably connected to first arm 112, wherein a range of rotation angle of second arm 116 relative to first arm 112 is limited by means of a mechanical stopper 118. Concretely, mechanical stopper 118 is constituted by a convex member 120 arranged on second arm 116 and another convex member 122 arranged on first arm 112 so that convex member 120 comes into contact with convex member 122 when second arm 116 is rotated by a predetermined angle.

For example, as a structure of a conventional mechanical stopper, Japanese Unexamined Patent Publication (Kokai) No. H05-228882 discloses a stopper device having a stationary side stopper 12 positioned on a stationary side member 11, a piezoelectric transducing element 16 for converting a pressure change in compressive fluid filled in a hollow closed space 15 installed in a rotatable member 10 on almost the same radius with stationary side stopper 12, into an electric signal, and a movable side stopper 13 with two piston rods 14a, 14b supported slidably in the rotational direction. Due to this constitution, a change of pressure in the compressible fluid to be produced by contacting piston rod 14a with stationary side stopper 12, is detected by piezoelectric transducing element 16, whereby any overrun is detected, while rotation of the rotatable member 10 can be stopped by means of elasticity in the compressible fluid.

Generally, in the mechanical stopper, portions of two arms are configured to collide with each other in order to limit the movable range of an arm. In recent years, a robot is required to convey a heavy load and to move rapidly, and a speed and torque of each joint is increased, whereby an impact force generated when the portions of the arms collide with each other becomes higher. In order for the mechanical stopper to be able to bear the impact force, some measures are necessary, wherein the impact force is attenuated by the compressible fluid as described in JP H05-228882 A, a stress is dispersed by increasing a volume of the stopper, or the impact force is absorbed by using a cushioning member such as a spring or rubber.

For example, Japanese Unexamined Patent Publication (Kokai) No. 2007-050499 discloses a technique to prevent a bolt from being subjected to shear, wherein a through hole of a base part of a stopper block, into which the bolt is inserted, is provided with a space for allowing the bolt to deform, so that the bolt is deformed so as to attenuate an impact force when a stopper collides with the stopper block by rotation of an arm, at a load above a predetermined value.

Further, as a technique for avoiding damaging of a member to which a bolt is fixed, as well as shearing of the bolt, Japanese Unexamined Patent Publication (Kokai) No. 2010-023194 discloses a structure wherein a groove, extending from a through hole for a stopper bolt in a collision direction of an arm, is formed on a member to which the stopper bolt is fixed, whereby shearing of the stopper bolt and damage of the member threaded with the stopper bolt can be prevented even when the stopper bolt collides with the arm and is deformed exceeding a predetermined amount.

In the conventional stopper structures as described in JP H05-228882 A, JP 2007-050499 A and JP 2010-023194 A, the cost of the structures may be high due to a large number of components. Further, such structures must be constructed with relatively high accuracy in order to avoid deterioration of reliability due to an assembling error of the structures. In addition, in the mechanical stopper as shown in FIG. 9, it is necessary to increase the volume of the stopper structure in order to disperse a stress generated when the collision. In this case, the speed of a motion axis of the robot may be decreased due to increase in weight thereof, and the appearance of the robot may not be good.

SUMMARY OF THE INVENTION

An object of the present invention is to provide a mechanical stopper device having a desirable stopper function while having a simple structure, and a multi-joint robot having the mechanical stopper device.

According to the present invention, there is provided a mechanical stopper device for a multi-joint robot having a first arm and a second arm rotatably connected to the first arm about a rotation axis, the mechanical stopper device being configured to limit a range of rotation angle of the second arm relative to the first arm by contacting a portion of the first arm to a portion of the second arm, wherein at least one of the portion of the first arm which contacts the second arm and the portion of the second arm which contacts the first arm is an elastically deformable body having a slit extending in a direction which intersects a contact direction.

In a preferred embodiment, the elastically deformable body is a hollow cylindrical member having a slit extending in a longitudinal direction of the hollow cylindrical member.

In a preferred embodiment, an angular position of the slit in a radial cross-section of the elastically deformable body is 70 to 110 degrees with respect to the contact direction.

In a preferred embodiment, the elastically deformable body is detachably press-fitted into a hole formed on the first arm or the second arm.

Also, the present invention provides a multi-joint robot comprising the mechanical stopper device of the invention.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
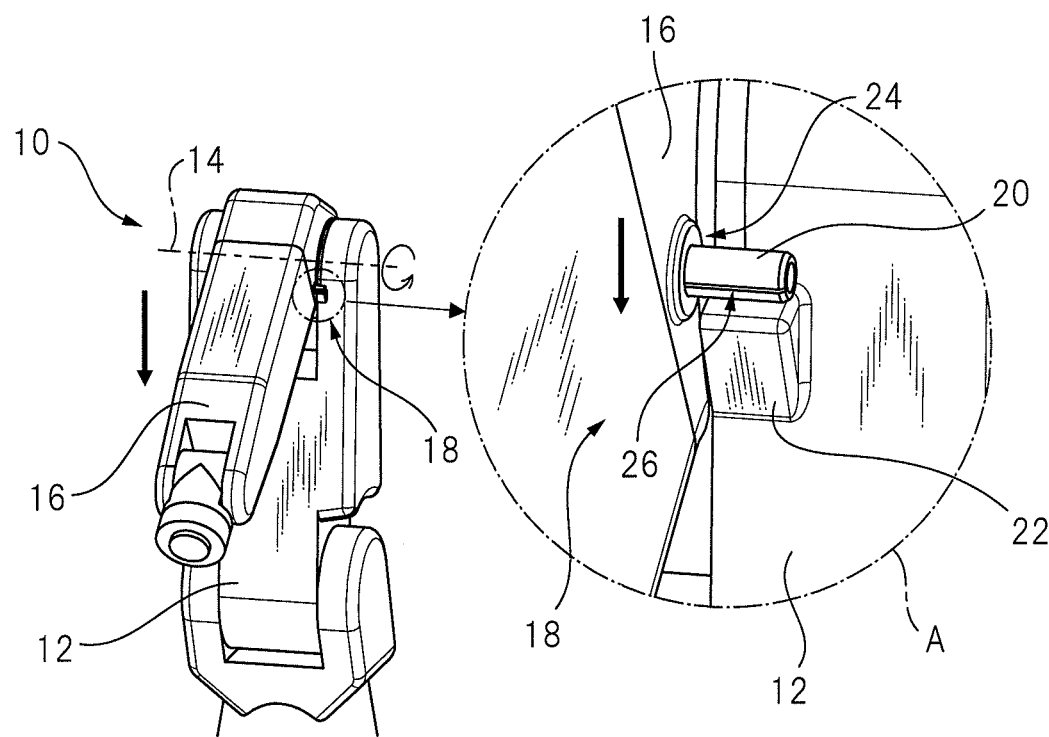
FIG. 1 is a view of a main part of a multi-joint robot having a mechanical stopper according to a first embodiment of the present invention.
Figure 2:
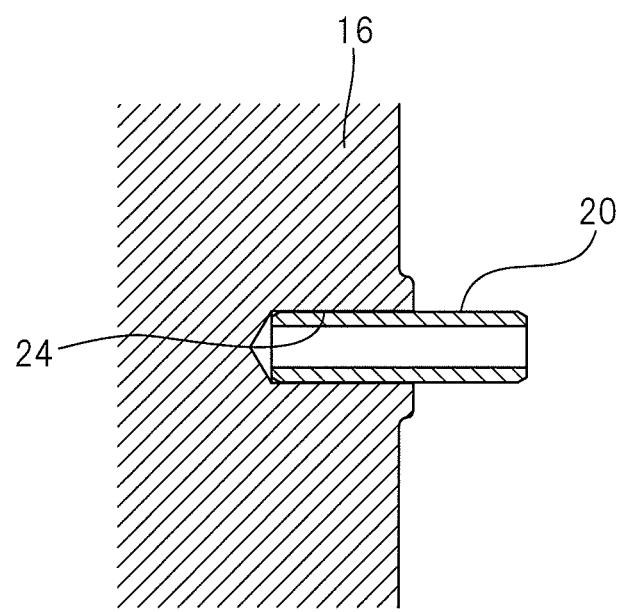
FIG. 2 is a cross-sectional view of a spring pin of the mechanical stopper of FIG. 1.

FIG. 1 is a view of a main part of a multi-joint robot having a mechanical stopper according to a first embodiment of the present invention, and FIG. 2 is a cross-sectional view of a portion where the mechanical stopper is attached. Multi-joint robot 10 a first arm 12 and a second arm 16 rotatably connected to first arm 12 about a rotation axis 14, and a range of rotation angle of second arm 16 relative to first arm 12 is limited by a mechanical stopper 18.

As shown in enlarged portion "A" of FIG. 1, mechanical stopper 18 is constituted by an elastically deformable body 20 arranged on second arm 16, and a contacting member 22 arranged on first arm 12 so that deformable body 20 comes into contact with contacting member 22 when second arm 16 is rotated by a predetermined angle. Contacting member 22 may be a convex member as shown, and may be elastic or substantially rigid.

Preferably, elastically deformable body 20 is a hollow cylindrical member, for example, may be a metallic spring pin formed from a cold rolled special steel strip as specified in JIS B2808. Spring pin 20 is press-fitted into a hole 24 which is formed on second arm 16 and extends in a direction parallel to rotation axis 14. Since a diameter of hole 24 is slightly larger than a diameter of free or unloaded spring pin 20, spring pin 20 is fixed to hole 24 by friction force due to internal pressure generated by elastic force of pin 20, whereby pin 20 cannot be easily detached from hole 24 by vibration or impact, etc., when robot 10 is in operation. The press-fitting of pin 20 into hole 24 may be carried out by hitting the pin with a metallic hammer, etc., and the removal of pin 20 from hole 24 may be carried out by withdrawing the pin with a pair of pliers, etc. Therefore, the attachment/detachment and replacement of the pin can be easily carried out. In addition, as shown in FIG. 2, it is preferable that the depth of hole 24 be approximately equal to a half of the entire length of spring pin 20.

As shown in part "A" of FIG. 1, spring pin 20 has a slit 26 extending in the longitudinal direction thereof, and the extending direction of slit 26 when pin 20 is inserted into hole 24 intersects with (is generally perpendicular to in the illustrated embodiment) a contact direction (or collision direction) of spring pin 20 against contacting member 22. By virtue of this, spring pin 20 can be elastically deformed when the pin comes into contact with contacting member 22. Concretely, as shown in FIG. 3, when second arm 16 is rotated relative to first arm 12 beyond a predetermined motion range due to an operational error, etc., second arm 16 can be prevented from further rotating by the contact between spring pin 20 and contacting member 22 of first arm 12.

Figure 4:
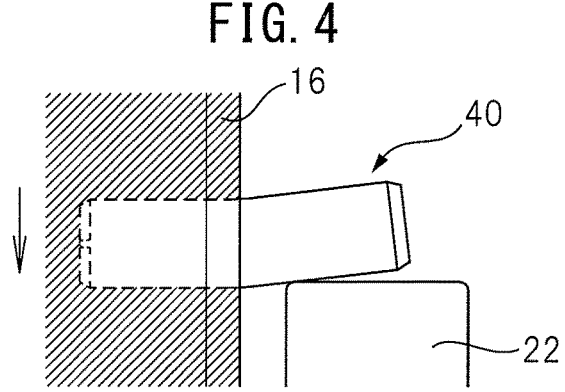
FIG. 4 is a view showing, as a comparative example, a state wherein a pin having no slit collides with a contacting member.
Figure 5:
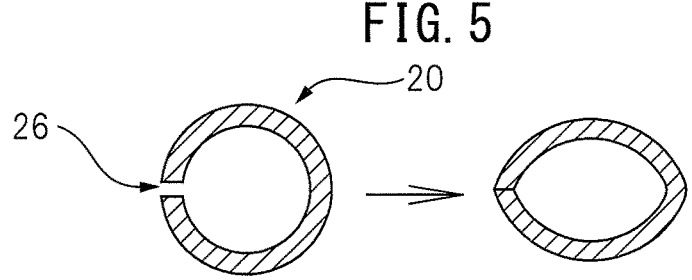
FIG. 5 is a view explaining deformation of a radial cross-section of the spring pin due to the collision, in the case of FIG. 3.
Figure 6:
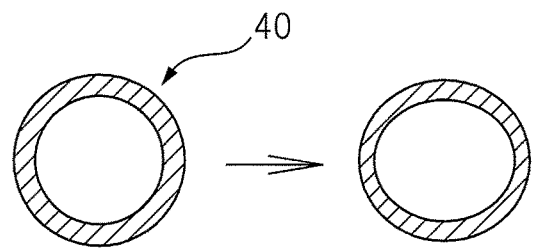
FIG. 6 is a view explaining deformation of a radial cross-section of the pin due to the collision, in the case of FIG. 4.

In this regard, spring pin 20 is deformed by the impact force from contacting member 22. In particular, spring pin 20 is deformed so that opposed portions 28 and 30 of the pin, which are separated by slit 26, slip relative to each other in the extending direction of the slit. Therefore, in comparison to a pin 40 having no slit as shown in FIG. 4, the portion of pin 20, which are not inserted into hole 24, can be elastically deformed more widely than pin 40. Further, as shown in FIG. 5 indicating a radial cross-section of spring pin 20, pin 20 having slit 26 can be widely deformed (or collapsed in the impact direction), in comparison to pin 40 having no slit as shown in FIG. 6.

Accordingly, in the present invention, spring pin 20 can be easily bent and can effectively absorb the impact force, in comparison to pin 40 having no slit (as shown in FIG. 4) and having the same size and the same material as pin 20. Due to such a structure, a portion of second arm 16 where the spring pin is fixed (for example, hole 24) and a portion of first arm 12 where the spring pin contacts (for example, contacting member 22) can be prevented from being damaged, as well as the spring pin. Further, the stopper may be reduced in size and weight. In addition, since a widely prevalent machine element may be used as spring pin 20 as described above, the spring pin is available at low cost, whereby the stopper structure can be made also at low cost.

Figure 3:
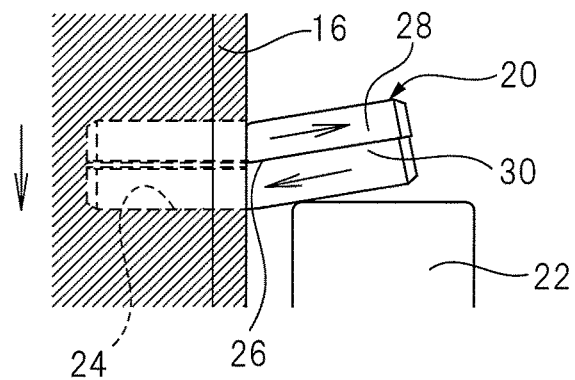
FIG. 3 is a view showing a state wherein the spring pin of FIG. 1 collides with a contacting member.

In order to effectively obtain the merit of the slip (or deformation) in relation to slit 26 as shown in FIG. 3, it is preferable that slit 26 extends generally perpendicular to a direction along which the impact force functions (the vertical direction in FIG. 3). Further, in order that spring pin 20 can be widely deformed as shown in FIG. 5, an angular position (or phase angle) of slit 26 in the radial cross-section of spring pin 20 is preferably 70 to 110 degrees, more preferably 80 to 100 degrees, furthermore preferably generally 90 degrees, with respect to the action direction of the impact force.

Figure 7:
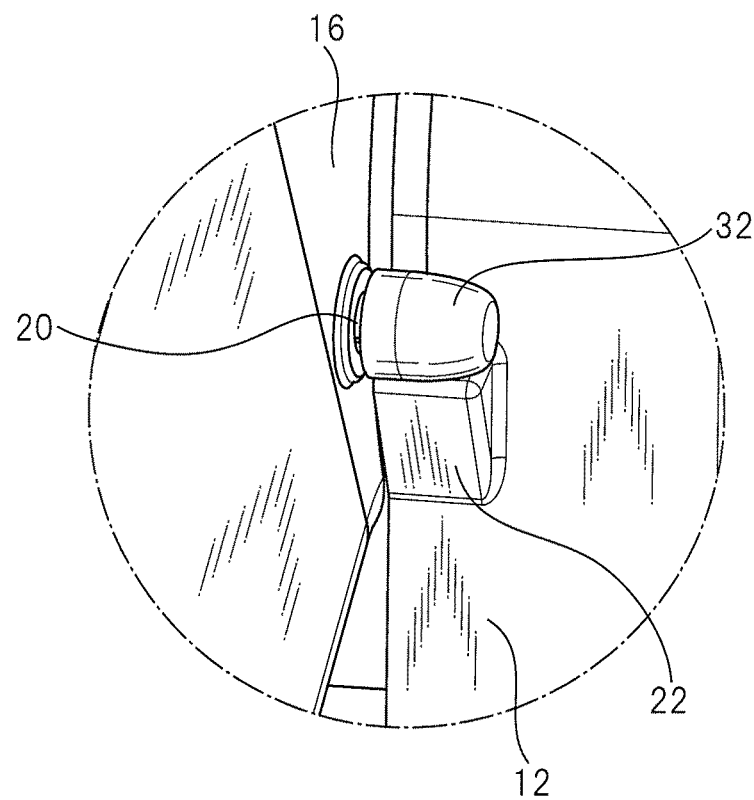
FIG. 7 is a view showing a state wherein a rubber cap is attached to the spring pin of FIG. 1.

FIG. 7 shows an example wherein a compliant cap 32, made from rubber or soft resin, is attached to an exposed portion spring pin 20. By virtue of elasticity of cap 32, the impact of the arm can be effectively absorbed, whereby the impact absorbing effect of the mechanical stopper can be highly improved. Since cap 32 prevents spring pin 20 from being wet, spring pin 20 does not rust. Further, since the spring pin is not exposed outside, the appearance thereof may be improved.

Figure 8:
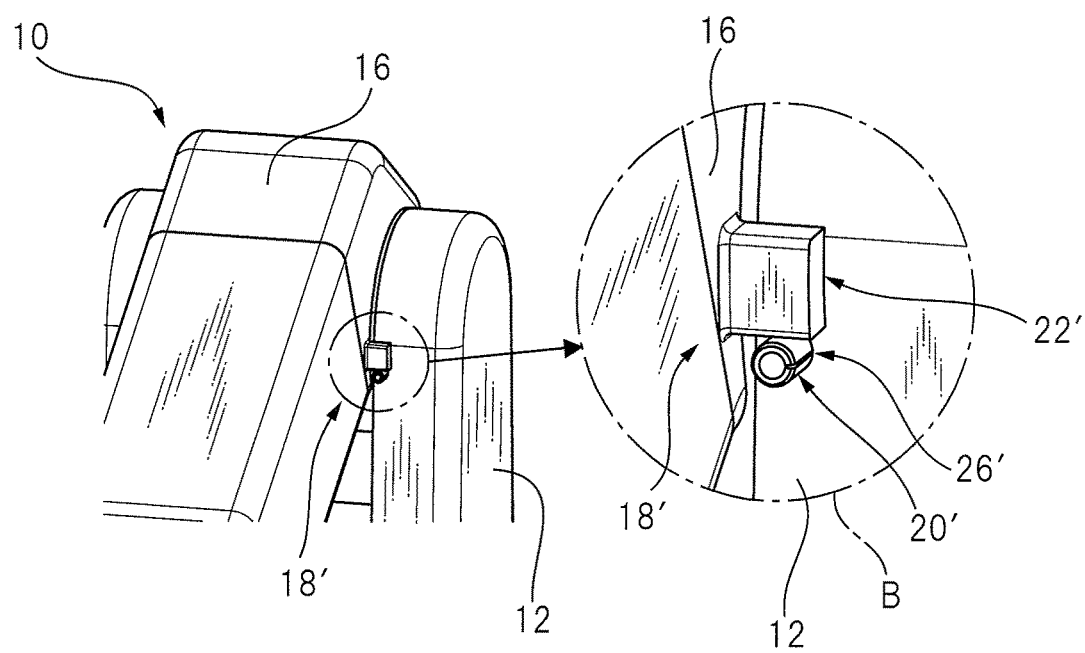
FIG. 8 is a view of a main part of a multi-joint robot having a mechanical stopper according to a second embodiment of the present invention.
Figure 9:
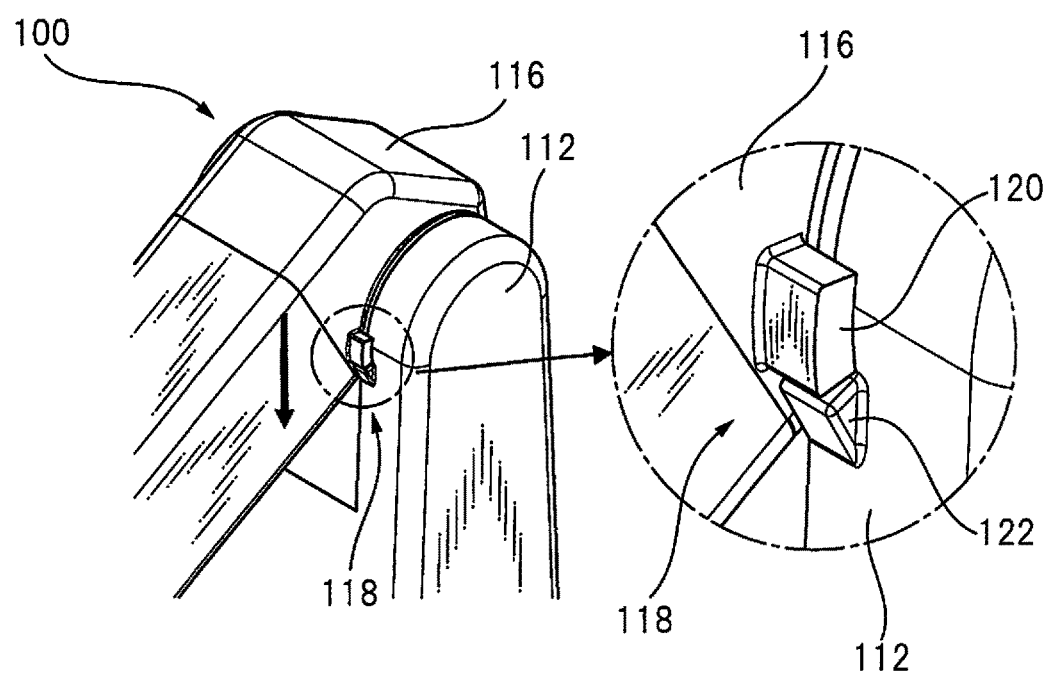
FIG. 9 is a view of a main part of a multi-joint robot having a conventional mechanical stopper.

FIG. 8 is a view of a main part of a multi-joint robot having a mechanical stopper 18' according to a second embodiment of the present invention. In the second embodiment, an elastically deformable body (spring pin 20') is attached to first arm 12 so that the spring pin extends perpendicular to the rotation axis of the arm. The deformable body is press-fitted into first arm 12, and a contacting member (convex portion) 22' is formed on second arm 16. Also in the second embodiment, due to the same effect as described above, the elastically deformable body absorbs the impact force, deforms, and limits the rotation of the arm. Also in the second embodiment, in order to effectively obtain the merit of a slit 26' formed on spring pin 20', slit 26' extends generally perpendicular to a direction along which the impact force functions (the generally vertical direction). Further, an angular position of slit 26' in the radial cross-section of spring pin 20' is generally 90 degrees, with respect to the action direction of the impact force.

As explained above, in the mechanical stopper of the multi-joint robot of the present invention, the replaceable elastically deformable body having the slit is applied to a member which is configured to contact another member. The elastically deformable body having the slit is press-fitted into the hole of one of the arms, and the extending direction of the slit is preferably generally perpendicular to the collision direction. By virtue of this structure, the mechanical stopper may be reduced in size, weight and cost. In addition, although the elastically deformable body having the slit may be arranged on either of the arms as described above, two of the deformable bodies may be arranged on both of the arms.

According to the present invention, in a mechanical stopper device arranged on a multi-joint robot, by using an elastically deformable body having a slit, the deformable body can be properly deformed by impact force so as to absorb the impact force. Therefore, in addition to the damage to the elastically deformable body, the damage to the member, which contacts the deformable body, can be avoided. Further, since a widely prevalent machine element may be used as the elastically deformable body, the deformable body is available at low cost, whereby the mechanical stopper device can be reduced in size and cost.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A mechanical stopper device for a multi-joint robot, the robot having a first arm and a second arm rotatably connected to the first arm about a rotation axis, the mechanical stopper device being configured to limit a range of a rotation angle of the second arm relative to the first arm by contacting a portion of the first arm with a portion of the second arm, the mechanical stopper device comprising an elastic deformable body,
wherein
at least one of the portion of the first arm which contacts the second arm and the portion of the second arm which contacts the first arm is the elastically deformable body,
the elastically deformable body is a hollow cylindrical member having a slit on an outer circumferential surface of the hollow cylindrical member and along a longitudinal direction of the hollow cylindrical member,
the slit extends in a direction which intersects a contact direction in which the portion of the first arm contacts the portion of the second arm,
the elastically deformable body has opposing portions separated by the slit, and the opposing portions are configured to directly contact each other and slip relative to each other in the longitudinal direction of the hollow cylindrical member when the elastic deformable body is deformed by an impact force of the at least one of the portion of the first arm which contacts the second arm and the portion of the second arm which contacts the first arm, and
an angular position of the slit in a radial cross-section of the elastically deformable body is 70 to 110 degrees with respect to the contact direction in which the portion of the first arm contacts the portion of the second arm upon application of the impact force to the elastically deformable body.

2. The mechanical stopper device as set forth in claim 1, wherein the elastically deformable body is detachably press-fitted into a hole formed on the first arm or the second arm.

3. A multi-joint robot, comprising:
a first arm;
a second arm rotatably connected to the first arm about a rotation axis; and
a mechanical stopper device configured to limit a range of a rotation angle of the second arm relative to the first arm by contacting a portion of the first arm with a portion of the second arm,
wherein
the mechanical stopper device includes an elastically deformable body,
at least one of the portion of the first arm which contacts the second arm and the portion of the second arm which contacts the first arm is the elastically deformable body,
the elastically deformable body is a hollow cylindrical member having a slit on an outer circumferential surface of the hollow cylindrical member and along a longitudinal direction of the hollow cylindrical member,
the slit extends in a direction which intersects a contact direction in which the portion of the first arm contacts the portion of the second arm,
the elastically deformable body has opposing portions separated by the slit, and the opposing portions are configured to directly contact each other and slip relative to each other in the longitudinal direction of the hollow cylindrical member when the elastic deformable body is deformed by an impact force of the at least one of the portion of the first arm which contacts the second arm and the portion of the second arm which contacts the first arm, and
an angular position of the slit in a radial cross-section of the elastically deformable body is 70 to 110 degrees with respect to the contact direction in which the portion of the first arm contacts the portion of the second arm upon application of the impact force to the elastically deformable body.

4. The multi-joint robot as set forth in claim 3, wherein the elastically deformable body is detachably press-fitted into a hole formed on the first arm or the second arm.

5. The multi-joint robot as set forth in claim 3, wherein the slit extends through a circumferential wall of the hollow cylindrical member in a thickness direction of the circumferential wall.

6. The mechanical stopper device as set forth in claim 1, wherein the slit extends through a circumferential wall of the hollow cylindrical member in a thickness direction of the circumferential wall.

* * * * *